Dec. 24, 1968 J. D. SAUTER ET AL 3,418,497
CURRENT CONTROL CIRCUIT INCLUDING PHASE SHIFT MEANS
FOR SELECTIVE FIRING OF A PHASE CONTROLLED
SWITCH MEANS
Filed Oct. 23, 1965
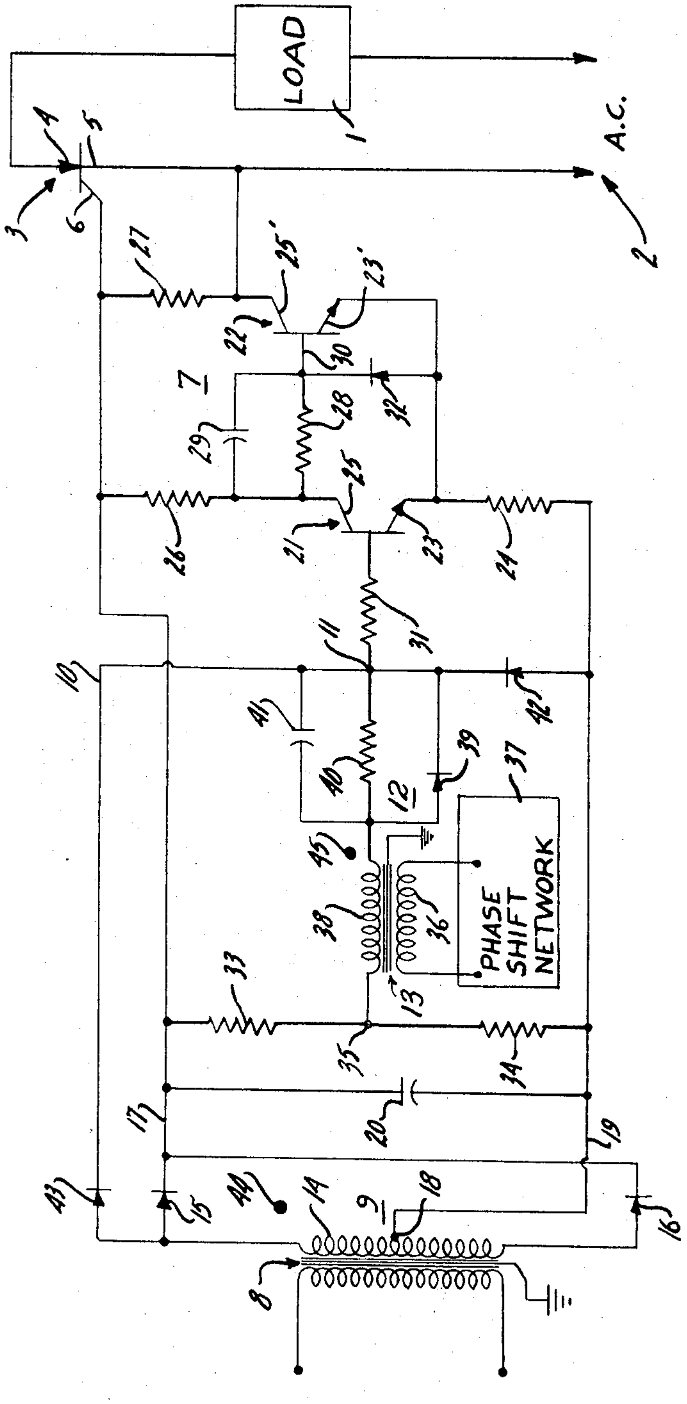
INVENTORS
JOHN D. SAUTER
KENNETH L. DAGGS
BY
Andrus & Starke
Attorneys United States Patent Office 3,418,497

Patented Dec. 24, 1968

3,418,497

CURRENT CONTROL CIRCUIT INCLUDING PHASE SHIFT MEANS FOR SELECTIVE FIRING OF A PHASE CONTROLLED SWITCH MEANS

John D. Sauter, Lyndhurst, and Kenneth L. Daggs, East Cleveland, Ohio, assignors to The Clark Controller Company, Cleveland, Ohio, a corporation of Ohio Filed Oct. 23, 1965, Ser. No. 503,394
8 Claims. (Cl. 307—252)

ABSTRACT OF THE DISCLOSURE

This disclosure relates to generating a variable width flat top pulse having a steep overshooting leading edge for a silicon controlled rectifier. A modified Schmitt trigger circuit includes a normally conducting output transistor and a nonconducting input transistor. A full wave rectifier in series with a phase shift transformer is connected to the input transistor. A diode also connects the input transistor to an A.C. signal to bias the input transistor on for at least one half cycle of the power cycle and thereby turn off the output transistor. The phase shift signal from the transformer is in phase with the turn off signal and selectively shifted into the portion of the cycle which would normally turn on the silicon controlled rectifier to provide an overriding control.

This invention relates ot a pulse forming circuit and particularly to such a circuit for generating a variable width flat top pulse having a steep overshooting leading edge.

In connection with control circuitry, silicon controlled rectifiers and the like have been employed to control the energization level of a load by selective triggering of the rectifier into a conducting state. Silicon controlled rectifiers are generally three terminal devices having a pair of main power terminals and a gate terminal. In order to fire the rectifier the polarity applied across the main terminals as well as the polarity between the gate and a common main terminal must have the same relatively positive polarity. Further, when the polarity applied to the main electrodes is reversed, the controlled rectifier will inherently switch to a nonconducting state and remain nonconducting irrespective of gate signals until such time as the proper polarity signal is applied.

The present invention is particularly directed to an improvement in the forming of a pulse circuitry particularly adapted for operating of high current silicon controlled rectifiers and the like.

Generally, in accordance with the present invention, the firing circuit for the rectifier includes a modified Schmitt trigger circuit or similar bistable circuitry connected to the gate circuit of the silicon controlled rectifier or the like. A modified Schmitt trigger circuit generally employs an output transistor and an input transistor interconnected in a regenerative feedback. In accordance with the present invention, the input bias circuitry is selected such that in the absence of a signal on the control transistor of a selected magnitude the output transistor is maintained in a stable operating or conducting state to provide current to the output circuit. When an input signal is applied to the input transistor, it operates to cut off the output transistor and remove current from the gate circuit and prevent firing to provide a reverse action control in contrast with the more usual control wherein the input power signal generates an output power signal.

In accordance with an important aspect of the present invention, the input control circuit includes a direct current bias control in combination with a phase shiftable A.C. signal superimposed upon each other across the input circuit of the input transistor of the Schmitt trigger circuit or the like. Additionally, a separate turn-off signal is connected to the input control transistor to positively turn on the input transistor for at least one half cycle of the power cycle and thereby turn off the output transistor. The phase shiftable signal may be in phase with the turn-off signal and shifted into the portion of the cycle which would normally turn on the silicon controlled rectifier. In operation, the phase shiftable signal superimposed on the D.C. signal increases the effective width of the positive half of the alternating current cycle and increases the control over that obtained in the absence of a D.C. signal and with a pure alternating current input to the Schmitt trigger circuit.

During the one half cycle, the turn-off input signal maintains the input transistor conducting and turns off the output transistor. During the alternate half cycle in the absence of a signal from the control circuit, the removal of the turn-off signal would permit the output transistor to conduct and turn on the silicon controlled rectifier for the corresponding half cycle. The in-phase alternating current control signal would tend to turn off the input transistor and maintain the output circuit. If the A.C. signal is shifted however its positive half cycle shifts into the control portion or the normally conducting period for the silicon controlled rectifier and provides a control tending to maintain the input transistor on and thereby mantaining the silicon controlled rectifier control circuit in an off condition. The insertion of the direct current override or bias signal into the circut changes the reference position of the A.C. control signal and the bias in the input transistor and effectively controls the period during which it can provide an effective control within the normal 180° firing cycle.

The combined A.C. and D.C. control signal in combination with the Schmitt trigger circuit provides a highly sensitive control. Further, the Schmitt trigger circuit provides a switching action with a resultant rapid pulse rise highly desirable in the triggering of a silicon controlled rectifier and further can provide a slight overshooting at the leading or triggering edge.

The present invention thus provides an improved trigger circuit particularly adapted for firing of a silicon controlled rectifier and the like.

The drawing furnished herewith illustrates a preferred construction of the present invention in which the above advantages and features are clearly illustrated as well as others which will be clear from the following description.

The drawing is a schematic circuit diagram of a silicon controlled load circuit employing the phase controlled firing in accordance with the present invention.

Referring to the drawing, a load 1 is shown in block diagram connected to a suitable power source 2 in series with a silicon controlled rectifier 3 for controlling the application of power to the load. The silicon controlled rectifier 3 is a known device and includes an anode 4, a cathode 5 and a gate 6. The load 2 is connected in series with the anode to cathode circuit of rectifier 3 which is selectively turned on by application of a control signal between gate 6 and cathode 5. A control circuit constructed in accordance with the present invention is connected to the gate 6. Generally, the control circuit includes a Schmitt trigger circuit 7 connected to be energized from a power supply including a transformer 8 and a rectifier circuit 9. The Schmitt trigger circuit 7 is controlled by a turn-off branch 10 connected between the transformer 8 and an input terminal 11 of the Schmitt trigger circuit 7 and a combined phase and direct current signal circuit 12 energized from the rectifier circuit 9 and a phase transformer 13.

Generally, the alternating current signal applied via the turn-off branch 10 is in phase with the main A.C.

power supply to the load 1 and the silicon controlled rectifier 3. During the positive half cycle, when the branch 10 applies an input to the Schmitt trigger circuit 7, firing of the silicon controlled rectifier 3 is prevented. During the alternating half cycle, the turn-off branch 10 is effectively removed and the Schmitt trigger circuit 7 is reset to apply a firing signal to the silicon controlled rectifier 3 to permit conduction for the corresponding half cycle. In accordance with the present invention, the A.C. phase shift control signal however is applied to the Schmitt trigger circuit 7 such that the presence of an A.C. signal maintains the Schmitt trigger circuit 7 in the initial stable condition and prevents triggering of the silicon controlled rectifier 3 and thereby prevents application of load current for the period of the phase shift. Further, as hereinafter more fully developed, the application or superposition of the D.C. control signal on the A.C. control signal increases the effective control time of the phase shift signal.

In summary, the present circuit provides a positive turn-off signal during 180° of the power cycle and during the opposite normally conducting power cycle provides an A.C. control signal to prevent the normal turn-on for a desired period. Consequently, the present circuit operates in a reverse direction; namely, when an input signal is present, the output signal is removed while, when the input signal is absent, the output signal operates in the normal manner to provide conduction for the period that the input signal is removed.

More particularly, in the illustrated embodiment of the invention, the main power supply transformer 8 includes a primary 13 connected to a 60 cycle voltage source, not shown, to provide an in-phase power relationship with respect to the load circuit. The transformer 8 includes a tapped secondary 14 having the opposite ends interconnected through suitable diodes 15 and 16 to a positive D.C. lead 17 and the center tap 18 connected as the negative D.C. lead 19. A filtering capacitor 20 is connected directly between the lines 17 and 19 to provide a filtered D.C. which is applied to simultaneously energize the several control circuits and the Schmitt trigger circuit 7.

The illustrated Schmitt trigger circuit 7 includes a pair of NPN transistors, identified as an input transistor 21 and an output transistor 22, connected in a common emitter configuration corresponding elements of transistor 21 and 22 being similarly numbered with transistor 22 distinguished by primed numbers. The emitters 23 and 23' are connected together in series parallel with a common emitter resistor 24 to the negative line 19. The collectors 25 and 25' are separately connected to the positive line 17 through individual resistors 26 and 27. The collector 25 of the input transistor 21 is connected in series with a resistor 28 and a paralleled capacitor 29 to the base 30' of the output transformer 22. The input transistor 21 has its base 30 connected in series with a base resistor 31. A diode 32 is shown connected between the base 30' of the output transistor 22 and the common emitters 23 and 23' to limit the reverse voltage applied to the transistor 22 in the illustrated embodiment of the invention.

Generally, in the absence of any input signal to the input transistor 21, a turn-on bias circuit is established from the positive line 17 through the resistors 26 and 28, the base 30' to emitter 23', the circuit of the transistor 22 and back to the negative line 19 through the common emitter resistor 24. This turns on the output transistor 22 and provides a current through the collector-emitter circuit thereof. The gate 6 to cathode 5 circuit is a relatively low resistance circuit connected directly in parallel with the collector resistor 27 of high relative value and thus the current is primarily diverted through the silicon controlled rectifier 3 for the period that the transistor 22 is on. In accordance with known Schmitt trigger circuit operation, the conduction through the transistor 22 provides a reverse bias on the transistor 21 which will maintain it in the cut-off state.

The input transistor 21 is provided with a pair of control signals, one of which is fed through the turn-off branch 10 and the other of which is from the control signal circuit 12. The combined A.C. and D.C. control signal of circuit 12 generally is generated or provided in the following manner.

A voltage dividing network including series connected resistors 33 and 34 is connected across the D.C. lines 17 and 18. The center junction 35 provides a D.C. control signal.

The alternating current phase shift transformer 13 includes a primary 36 connected to a suitable phase shift network 37 such as shown in block diagram and a secondary 38 connected between the D.C. voltage junction 35 and the input terminal 11, as presently described.

The phase shift network 37 may be of any suitable variety for example the usual center tapped transformer having a series resistor-capacitor connected across the circuit to provide a phased related signal to the primary 36 of isolating transformer 13. As such circuits are well known, no further illustration or description thereof is given herein.

The secondary 38 of the isolation transformer 13 is connected between the positive D.C. terminal 35 and input terminal 11 in series with a diode 39. Resistor 40 serves to discharge capacitor 41. A speed-up capacitor 41 is also shown connected in parallel with the paralleled resistor 40 and diode 39 to provide a rapid action.

A diode 42 is connected between the base terminal 11 and the negative line 19 to limit the reverse bias voltage applied to the input transistor 21, similar to the diode 32 in the illustrated embodiment of the invention.

The turn-off branch 10 includes a diode 43 connected to one side of the transformer 8 and the input junction or terminal 11 to the resistor 31. The phase relationship of the windings of the main transformer 8 and of the phase shift transformer 13 are shown in the usual manner by dots 44 and 45 at the ends of the windings corresponding to a positive polarity at a given instance, which polarity will exist for a corresponding 360° when the signals are in phase.

When the diode 43 is biased to conduct by the illustrated polarity, the power or a turn-off signal is applied directly from the top side of the secondary 8, through the diode 43, the resistor 31 and the base 30 to emitter 23 circuit of the transistor 21 and resistor 24 to the negative power line 19. A paralleled circuit is provided through the resistor 40 in parallel with capacitor 41, the secondary 38 of the phase shift transformer 13 and resistor 34 to the negative terminal 19.

During this period, the transformer secondary, assuming an in-phase relationship, provides an aiding voltage signal driving transistor 21 on to maintain the transistor 22 off.

When the transistor 21 is turned on, it provides a short circuit or low resistance circuit between the base to emitter circuit of the transistor 22 to turn off transistor 22. The regenerative action associated with a Schmitt trigger circuit rapidly switches the circuit with transistor 22 to off and the transistor 21 conducting. When an input signal is applied to the input transistor 21, the circuit reverses and the output is removed positively preventing firing of the rectifier 3 and energization of the load.

During the alternate half cycles, the diode 43 is back biased and consequently the signal directly from the main transformer secondary 14 is removed from the transistor 21. The only control signal effective is that supplied by the network or circuit 12 which consists of two components: a direct current component derived from the D.C. voltage dividing network of the resistors 33 and 34 and an A.C. phase shift signal supplied by the transformer secondary 38.

In the absence of the D.C. signal and assuming an in-phase relationship, the opposite half cycle of the phase shift signal from secondary 38 would merely tend to back bias the transistor 21 to turn it off and allow transistor 22 to conduct. Further, if the phase shift signal is shifted, the initial angular control is lost in overcoming the forward bias voltage drop of the transistor 21 and the control would be less than the desired 180° intended to be established by the main turn-off control signal.

In accordance with the present invention, the superimposed D.C. signal provides an initial bias which increases the effective width of the A.C. phase signal to cover the complete 180 degrees when the turn-off branch 10 is inoperative.

Thus, in accordance with the present invention, the D.C. signal provides a sufficient bias such that when the branch 10 turns off and the A.C. phase shift signal is passing through zero, the transistor 21 is at an immediate position to be turned off or to be maintained conducting by any slight additional current. If the A.C. phase shift signal is passing through zero, the input transistor 21 is back biased to turn off and the transistor 22 through the normal direct current bias circuit of resistors 26 and 28 and the base 30 to emitter 23' circuit, turns on to provide a firing current to the gate 6 to cathode 5 circuit of silicon controlled rectifier 3. As previously noted, the low resistance of this rectifier circuit causes most of the current to flow therethrough and thereby provide a rapidly rising leading flat top pulse for firing of the high current silicon controlled rectifier 3. However, if the A.C. signal has been shifted forwardly, the positive half cycle will be maintained and establish a turn-on signal to the input transistor 21 for the period of the phase shift. As the superimposed direct current signal also forward biases the transistor 21, the complete phase shift signal is effective to maintain the transistor 21 conducting, the transistor 22 nonconducting and the rectifier 3 held off. By increasing the phase angle, the firing of the silicon controlled rectifier 3 can be retarded to any desired degree through the 180° angle.

In summary, the present invention employing a Schmitt trigger circuit provides a reverse acting circuit whereby the output is removed in the presence of an input control signal and is applied in the absence of such a control signal. Further, the particularly novel input control for the Schmitt circuit employing the direct current in combination with the phase shiftable alternating current provides an input signal whereby the A.C. signal is completely in control for a full 180°. This produces a control for firing of a silicon controlled rectifier and the like during the complete effective width of the positive half of the alternating current signal cycle in a simple and inexpensive manner.

Various modes of carrying out the invention are contemplated as being within the scope of the following claims particularly pointing out and distinctly claiming the subject matter which is regarded as the invention.

We claim:

1. In a current control circuit for energizing of a load from an alternating current power supply and controlling the enegization by selective firing of a controlled rectifier connected in series with the load and having a gate to cathode circuit,
   - a full wave rectifying circuit providing a pair of direct current leads,
   - a trigger circuit having an output transistor connected to the direct current leads in a series energizing circuit with the gate to cathode circuit of the rectifier and an input transistor connected in a regenerative circuit with the output transistor, said trigger circuit being connected to the direct current leads to bias the output transistor on and the input transistor off, said input transistor having input elements,
   - an alternating current signal source connected to the input elements and operable to selectively bias said input transistor on for a first half cycle and correspondingly cut off the output transistor to prevent firing of the controlled rectifier and to selectively bias said first transistor off for a second half cycle,
   - a pulsating signal means connected to said input elements and establishing a pulse signal of a frequency corresponding to said source to positively turn on the input transistor for one half cycle of the signal source, and
   - means to shift the phase of the signal from said current signal source relative to said pulsating signal.

2. The control circuit of claim 1 having a direct current means connected in the signal source and establishing a direct current bias signal superimposed on the signal from said signal source.

3. In a current control circuit for energizing of a load, an alternating current power supply,
   - a full wave rectifying circuit connected across the supply to provide a pair of direct current leads,
   - a controlled rectifier for connection in series with the load and having a gate to cathode circuit,
   - a trigger circuit having an output transistor connected to the direct current leads in a series energizing circuit with the gate to cathode circuit and having an input transistor connected in a regenerative circuit with the output transistor, said trigger circuit direct current leads being connected to bias the output transistor on and the input transistor off, said input transistor having input elements,
   - signal circuit means providing a fixed direct current signal superimposed upon an alternating current signal and connected to said input elements to control the trigger circuit and the firing of the rectifier, and
   - said signal circuit means including a voltage dividing network connected to said leads and a phase shift transformer connected in a series input circuit to said input elements across a portion of said network.

4. The control circuit of claim 3 having a diode connected in said circuit and polarized to conduct current to bias said input transistor on.

5. The current control circuit of claim 4 having a turn-off control diode connected directly in series with the alternating current power supply and the input element of the input transistor to turn on the input transistor for one half cycle of the power supply whereby said control circuit can only be effective during the opposite half cycle.

6. In a firing circuit for a controlled rectifier,
   - a Schmitt trigger circuit having an output transistor and an input transistor having input elements and being connected in a regenerative switching circuit and having a bias circuit biasing said output transistor to conduct, said output transistor having terminal means for connection to the rectifier for firing the controlled rectifier,
   - a pair of direct current leads,
   - a voltage dividing network connected to the leads,
   - a phase shift alternating current source including an output transformer having a secondary,
   - a control circuit including said secondary connected between the voltage dividing network and the input element of the input transistor, and
   - said voltage dividing network supplying a bias voltage tending to turn on the input transistor and said secondary providing an alternating current bias tending to alternately turn the input transistor on and off.

7. The firing circuit of claim 6 having a turn-off control diode connected in series with an alternating current power supply having a frequency corresponding to said source and the input element of the input transistor to turn on the input transistor for one half cycle of the power supply whereby said control circuit can only be effective during the opposite half cycle.

8. In a current control circuit for energizing of a load, an alternating current power supply, a full wave rectifying circuit connected across the supply to provide a pair of direct current leads, a controlled rectifier for connection in series with the alternating current power supply and the load and having a gate to cathode circuit, a trigger circuit having an output transistor connected to the direct current leads in a series energizing circuit with the gate to cathode circuit and having an input transistor connected in a regenerative circuit with the output transistor, said trigger circuit direct current leads being connected to bias the output transistor on and the input transistor off, said input transistor having input elements, signal circuit means providing a fixed direct current signal superimposed upon an alternating current signal of the same frequency as said power supply and connected to said input elements to control the trigger circuit and the firing of the rectifier, and said signal circuit means including a voltage dividing network connected to said leads and a phase shift transformer connected in a series input circuit to said input elements across a portion of said network.

References Cited

UNITED STATES PATENTS

| | | | |
|---|---|---|---|
| 3,064,175 | 11/1962 | Vergez | 318—321 |
| 3,304,438 | 2/1967 | Muskovac | 307—88.5 |
| 3,309,602 | 3/1967 | Euvino et al. | 321—46 |

ARTHUR GAUSS, *Primary Examiner.*

S. D. MILLER, *Assistant Examiner.*

U.S. Cl. X.R.

307—262, 265, 290, 295; 323—22